United States Patent
Suzuki et al.

(10) Patent No.: US 6,798,598 B2
(45) Date of Patent: Sep. 28, 2004

(54) METHOD FOR CONTROLLING WRITE CURRENT TO A WRITE HEAD DURING DATA WRITE ON A HARD DISK

(75) Inventors: Hiroaki Suzuki, Tokyo (JP); Hideo Asano, Tokyo (JP); Yumi Nagano, Kanagawa-ken (JP); Michio Nakajima, Kanagawa-ken (JP); Masaomi Ikeda, Rochester, MN (US); Masashi Murai, Kanagawa-ken (JP)

(73) Assignee: International Business Machines Corporation, Armonk, NY (US)

( * ) Notice: Subject to any disclaimer, the term of this patent is extended or adjusted under 35 U.S.C. 154(b) by 344 days.

(21) Appl. No.: 10/091,411

(22) Filed: Mar. 5, 2002

(65) Prior Publication Data

US 2002/0141094 A1 Oct. 3, 2002

(51) Int. Cl.[7] ................................................ G11B 5/02
(52) U.S. Cl. ........................................ 360/68; 327/110
(58) Field of Search ............................. 360/68, 46, 67, 360/61, 63; 327/108, 110

(56) References Cited

U.S. PATENT DOCUMENTS 6,175,463 B1 * 1/2001 Nayebi et al. ................ 360/68
6,256,158 B1 * 7/2001 Brown et al. ................. 360/31

FOREIGN PATENT DOCUMENTS

| JP | 07-014107 | 1/1995 |
| JP | 08-096309 | 4/1996 |
| JP | 2000-222703 | 8/2000 |

* cited by examiner

*Primary Examiner*—Alan T. Faber
(74) *Attorney, Agent, or Firm*—Robert B. Martin; Dillon & Yudell LLP

(57) ABSTRACT

A method for controlling write current to a write head during data write on a hard disk drive is disclosed. A direct access storage device includes a rotating storage medium in which data are magnetically written, a write head for writing data in the rotating storage medium, and a write current control circuit for changing write current-value settings to be supplied to the write head according to a predetermined elapsed time from the beginning of a write operation.

8 Claims, 8 Drawing Sheets

(a)

(b)

W1=Wnom+Wboost
W2=Wnom (c)

(a) Write gate signal (b) Write current (c) Overwrite performance (a) Write current waveform (Presence of overshoot)

(b) Write current waveform (Absence of overshoot)

(a) Write gate signal (b) Write current (c) Overwrite performance

METHOD FOR CONTROLLING WRITE CURRENT TO A WRITE HEAD DURING DATA WRITE ON A HARD DISK

RELATED PATENT APPLICATION

The present patent application claims priority to co-pending Japanese Application No. 2001-097183, filed on Mar. 29, 2001.

BACKGROUND OF THE INVENTION

1. Technical Field

The present invention relates to direct access storage devices in general, and in particular to hard disk drives. Still more particularly, the present invention relates to a method for controlling write current to a write head during data write on a hard disk drive.

2. Description of the Related Art

A hard disk drive is one of the most prevailing direct access storage devices for data processing systems. A hard disk drive is provided with a combined magnetic head that includes a read head for reading data from a magnetic disk, and a write head for writing data to the magnetic disk. The magnetic head is coupled to an actuator mechanism to be moved and positioned by a voice coil motor. The actuator mechanism moves and positions the magnetic head to a predetermined track for reading or writing data. The moving-and-positioning operation is referred to as a seek operation.

In order to write data in a magnetic disk by a magnetic head, a magnetic layer formed on the magnetic disk is magnetized by supplying a predetermined amount of current to the write head. New data is frequently written over previously written data of the magnetic disk. Such process is referred to as overwrite. The overwrite characteristic showing whether overwrite is properly performed depends on a write current value for writing data by the write head. It is generally known that the overwrite characteristic is deteriorated because the magnetized pattern of previously written data cannot be completely re-magnetized when the write current value is too small. However, when the write current value is too large, a squeeze phenomenon occurs that can affect magnetized patterns of adjacent tracks. Moreover, the characteristic of a read signal is also frequently deteriorated. Therefore, it is necessary to set the write current value to a proper value.

An optimum write current value is not univocally decided. For example, it is known that overwrite performance is affected by the environment in which a hard disk drive is placed. Because the coercivity ($H_c$) of the magnetic film of a magnetic disk rises as temperature lowers, the overwrite characteristic deteriorates as temperature lowers, under a constant write current value. In addition, a hard disk drive is frequently provided with multiple magnetic disks and several magnetic heads corresponding to the number of storage faces of the magnetic disks. The overwrite characteristic may differ from magnetic disks and magnetic heads. In other words, the overwrite characteristic may differ for each combination of magnetic disks and magnetic heads due to the fluctuation in each magnetic head and magnetic disk. Furthermore, the overwrite characteristic fluctuates according to the location of a magnetic head, such as on an inner track or an outer track. Specifically, it is known that the overwrite characteristic is worse on an outer track of a magnetic disk because the data write speed is higher for the outer track.

There are various prior art methods for controlling the overwrite characteristic of a hard disk drive. For example, the method disclosed in Published Unexamined Japanese Patent Application No. 2000-222703 is effective for controlling the fluctuation in overwrite performance due to an environmental temperature. Published Unexamined Japanese Patent Application No. 2000-222703 discloses the art for setting a write current value according to an operating environment temperature of a hard disk drive and a magnetic head-magnetic disk combination. In addition, as for the overwrite characteristic differs for each magnetic head-magnetic disk combination, Published Unexamined Japanese Patent Application No. 1995-14107 discloses the art for automatically setting an optimum write current value for each magnetic head-magnetic disk combination. Furthermore, as for the overwrite characteristic fluctuates at an inner track and an outer track of a magnetic disk, Published Unexamined Japanese Patent Application No. 1996-96309 discloses the art for decreasing a write current value at an inner track and increasing a write current value at an outer track of a magnetic disk.

The overwrite characteristic has been somewhat improved by optimizing a write current value using some or all of the above-mentioned prior art. However, it is still preferable to have a better method for further optimizing a write current value corresponding to improvement of a recording density, and a flying height value of a magnetic head according to the improvement of the recording density. Consequently, it would be desirable to provide a method to improve the overwrite characteristic by controlling the supply of write current to a write head when writing data on a hard disk drive.

SUMMARY OF THE INVENTION

In accordance with a preferred embodiment of the present invention, a direct access storage device includes a rotating storage medium in which data are magnetically written, a write head for writing data in the rotating storage medium, and a write current control circuit for changing write current-value settings to be supplied to the write head according to a predetermined elapsed time from the beginning of a write operation.

All objects, features, and advantages of the present invention will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein.

DESCRIPTION OF A PREFERRED EMBODIMENT

Figure 1:
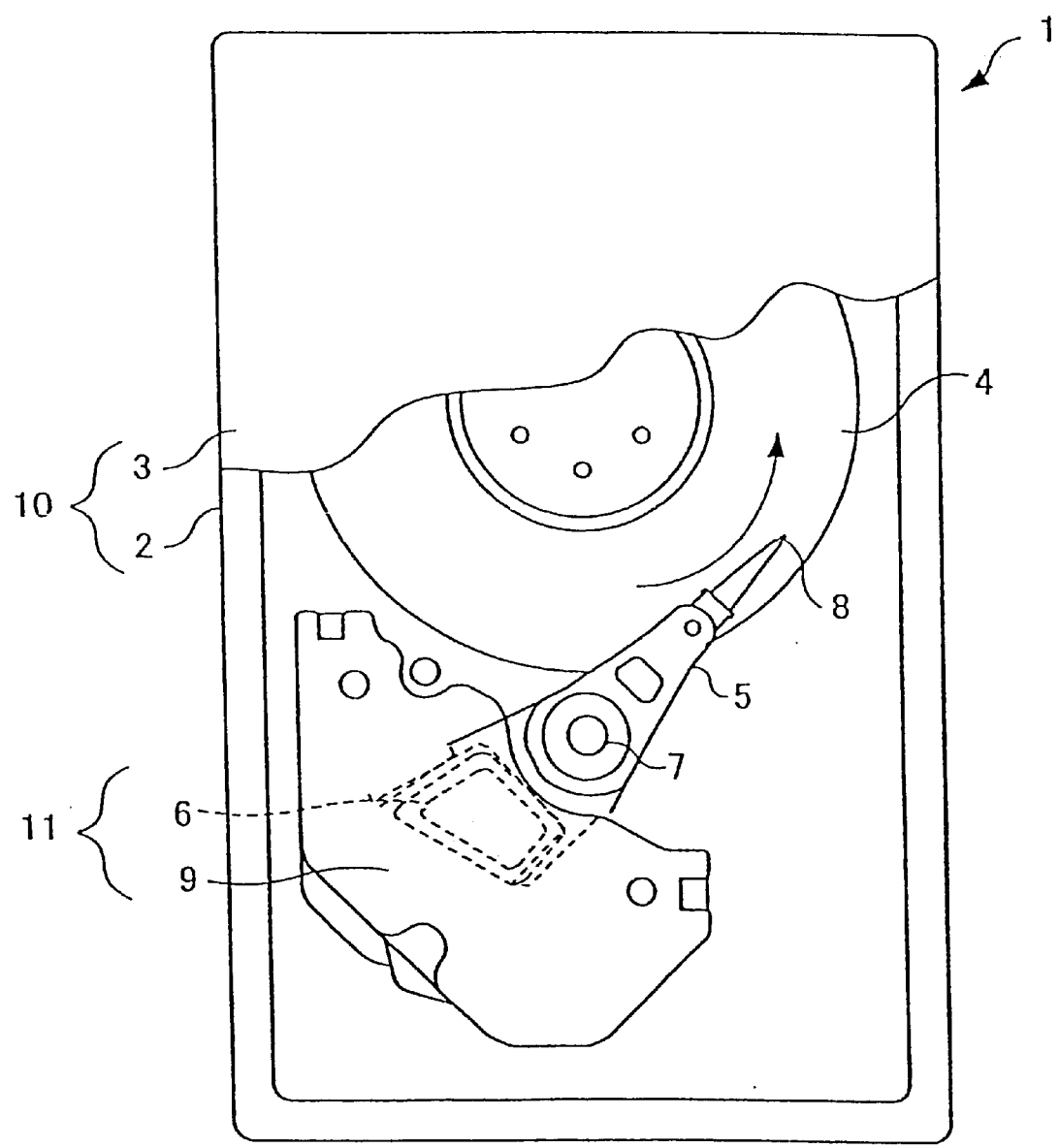
FIG. 1 is a top view of a hard disk drive in accordance with a preferred embodiment of the present invention.

Referring now to the drawings and in particular to FIG. 1, there is depicted a top view of a hard disk drive in accordance with a preferred embodiment of the present invention. As shown, a hard disk drive (HDD) 1 includes a disk enclosure 10 by sealing the open upper portion of a base 2 made of, for example, an aluminum alloy with a top cover 3. For example, top cover 3, which is made of brass, is secured to base 2 with a setscrew through a rectangular-frame-shaped sealing member (not shown). A spindle motor (not shown) includes, for example, a three-phase DC servo motor having a hub-in structure is set in disk enclosure 10 and a magnetic disk 4 serving as a storage medium is rotated by the spindle motor.

In addition, an actuator arm 5 is set in disk enclosure 10. The middle portion of actuator arm 5 is rotatably supported on base 2 through a pivot shaft 7. A read/write combined magnetic head 8 is provided for one end of actuator arm 5 and a voice coil motor (VCM) coil 6 is provided for the other end of arm 5. A VCM 11 includes VCM coil 6 and a VCM stator 9 using a permanent magnet. By supplying and controlling a VCM current to VCM coil 6, magnetic head 8 moves towards a predetermined position on magnetic disk 4. Seek of combined magnetic head 8 is executed by the rotation of arm 5. Magnetic disk 4 is rotated around the spindle shaft of the spindle motor when HDD 1 operates and stopped when HDD 1 does not operate.

Figure 3:
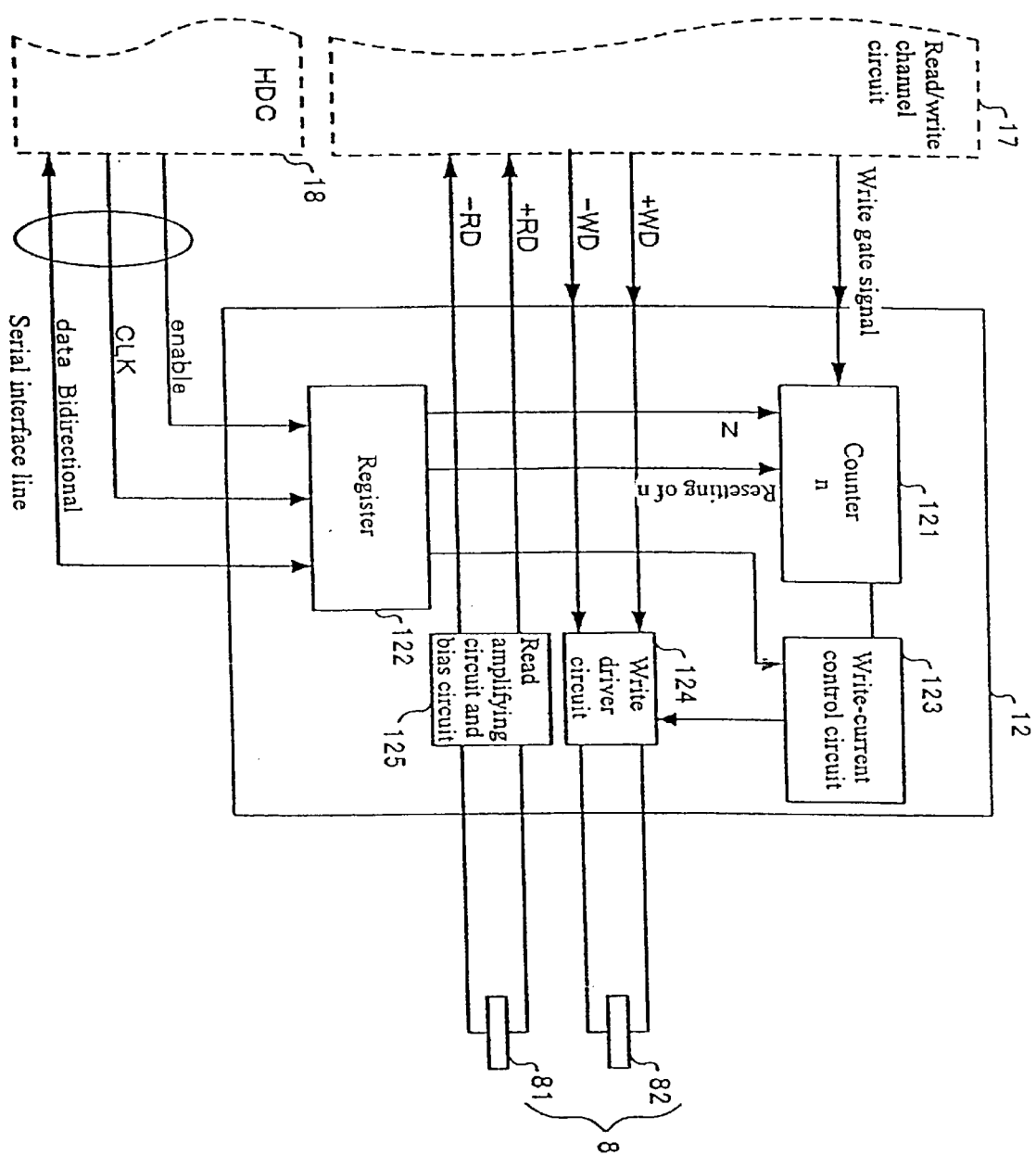
FIG. 3 is a block diagram of an arm electronics within the hard disk drive from FIG. 1, in accordance with a preferred embodiment of the present invention.

Combined magnetic head 8 includes a slider (not illustrated), a read head 81 comprising a GMR sensor set to the slider, and a write head 82 comprising an inductive converter (or coil) (shown in FIG. 3). Read head 81 reads servo information when data is read, written, or sought, and reads data when data is read. Actuator arm 5 rotates on the surface of rotating magnetic disk 4 when data is written or read and combined magnetic head 8 performs the seek operation for scanning the position of any track on magnetic disk 4. For example, a floating force is applied to the slider by the airflow produced between the slider and magnetic disk 4, and combined magnetic head 8 floats from the surface of magnetic disk 4 while keeping a certain distance and the distance is maintained.

Figure 2:
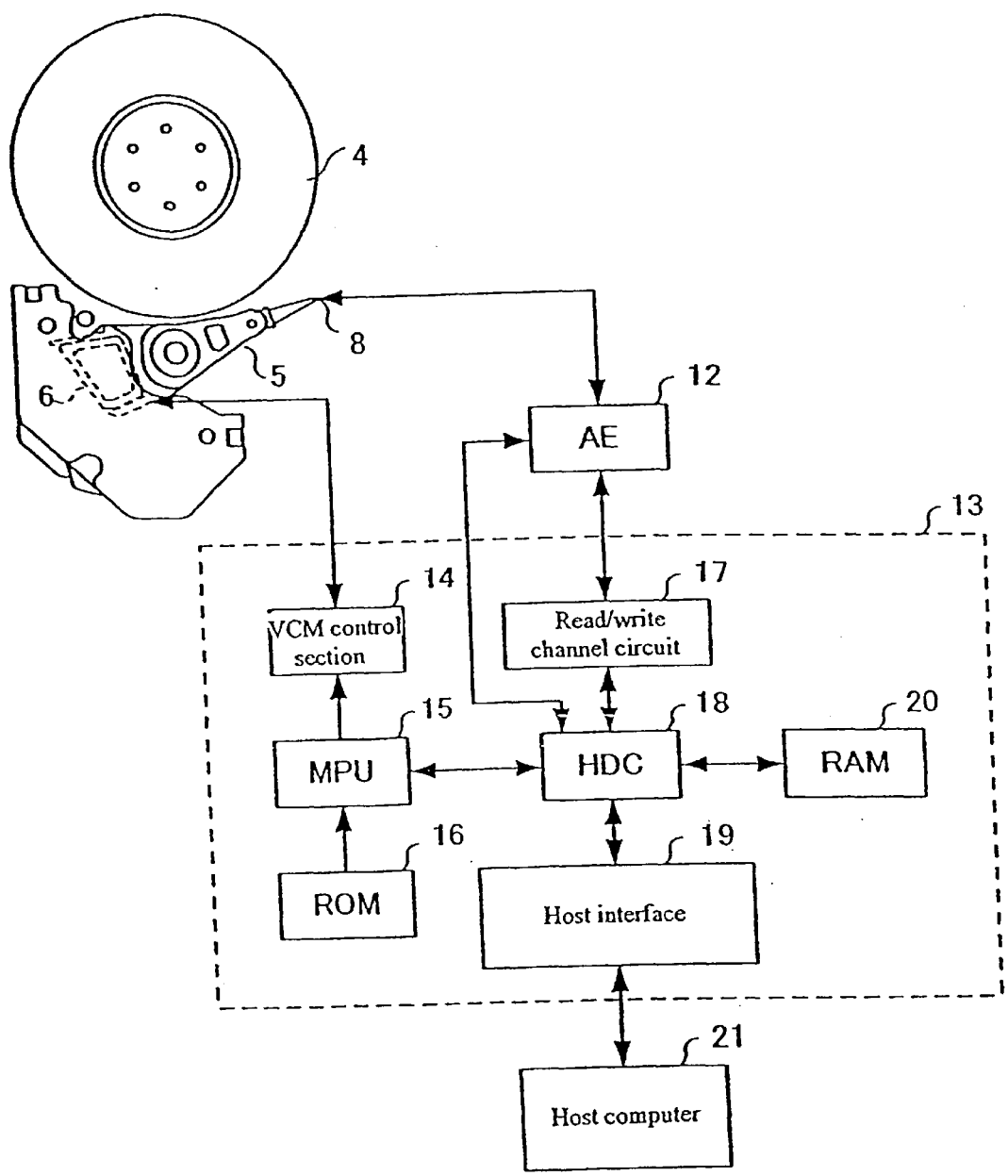
FIG. 2 is a block diagram of the hard disk drive from FIG. 1, in accordance with a preferred embodiment of the present invention.

In FIG. 2, an arm electronics (AE) 12 is set to actuator arm 5 to supply a bias current to read head 81 and amplify a small readback signal of read head 81 for reading data from magnetic disk 4 and supplies a write current to write head 82 under write. A control section 13 includes an electronic circuit for controlling operations of actuator arm 5 and executing data read/write. Control section 13 controls the seek operation of actuator arm 5 through a VCM control section 14, and also controls the read/write operation of AE 12 through a read/write channel circuit 17. Read/write channel circuit 17 is connected to a hard disk controller (HDC) 18. Read/write channel circuit 17 and AE 12 bidirectionally converts a digital signal of user data and a voltage/current signals supplied to and generated by combined magnetic head 8.

A host computer 21 is connected to HDC 18 through a host interface 19. HDC 18 controls a random access memory (RAM) 20, relays data between host computer 21 and magnetic disk 4, generates an ID table, generates a position error signal (PES) in accordance with servo data, and provides the position information of combined magnetic head 8 to a microprocessing unit (MPU) 15. RAM 20 also holds a unit-controlling micro code, read from magnetic disk 4 at start of unit and an ID table. HDC 18 is connected to MPU 15, and MPU 15 connects with a read only memory (ROM) 16 and VCM control section 14. MPU 15 interprets a command sent from host computer 21 to instruct HDC 18 to read or write data in the address designated by the command, and sends the control information, for seeking combined head 8 for a predetermined track, to VCM control section 14 according to the position information of combined head 8 generated by HDC 18. VCM control section 14 drives VCM coil 6 so as to position combined magnetic head 8 to a predetermined track according to the control information output from MPU 15. ROM 16 holds a micro code necessary for start of the unit.

As shown in FIG. 3, AE 12 is present between combined magnetic head 8 and read/write channel circuit 17. Physically, AE 12 is set nearby combined magnetic head 8 of actuator arm 5. AE 12 receives a write gate signal and write data values (+WD and −WD) from read/write channel circuit 17. In addition, AE 12 receives a signal from read head 81 and supplies read signals (+RD and −RD) to read/write channel circuit 17 through read-amplifying circuit and bias circuit 125. Moreover, AE 12 supplies a write current to write head 82 through a write driver circuit 124 according to write gate signal and write data values (+WD and −WD). In this embodiment, write data and a read signal are differentially transmitted and they become a pair of plus and minus signals. The write current value is set by a register 122. A clock signal (CLK), an enable signal (enable), and data signal (data) constituting a serial interface (circuit) are supplied to register 122 from HDC 18. AE 12 is provided with a counter 121. Counter 121 counts the number of transitions of a write gate signal. The meaning of the number of transitions will be described later. Register 122 sets a write current value to be supplied to write head 82 correspondingly to the number of transitions. That is, a write-current control circuit 123 refers to the number-of-transitions information of a write gate signal supplied from counter 121 and set-value information supplied from register 122, and sets and controls a current value to be supplied to write head 82 from write driver circuit 124.

Figure 4:
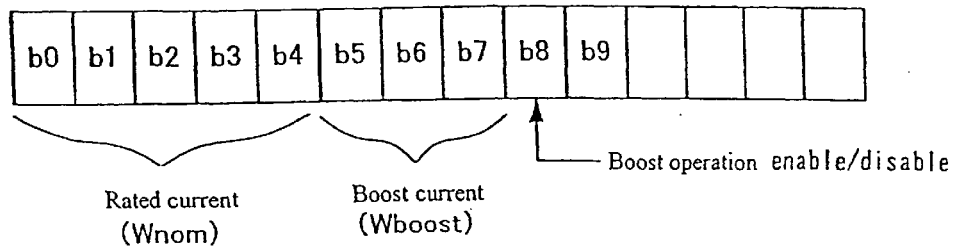
FIGS. 4a–4c illustrates a register configuration within the arm electronics from FIG. 3, in accordance with a preferred embodiment of the present invention.
Figure 4:
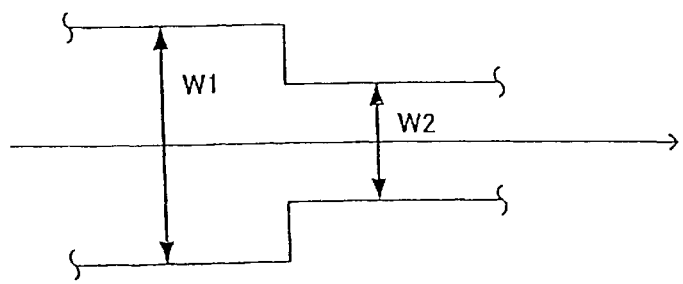
Figure 4:
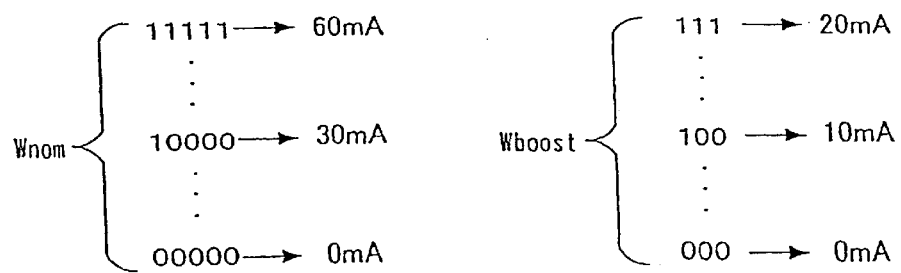

FIG. 4a shows a configuration of register 122 of AE 12. Eight bits (i.e., b0 to b7) of register 122 are assigned as bits for setting a write current value. Among the eight bits, five bits (i.e., b0 to b4) are assigned for a nominal current ($W_{nom}$) and three bits (i.e., b5 to b7) are assigned for a boost current ($W_{boost}$). In the present example, the nominal current ($W_{nom}$) denotes a current to be constantly supplied to write head 82 of combined magnetic head 8 under a write operation. The boost current ($W_{boost}$) denotes a current to be added to the nominal current ($W_{nom}$) at the beginning of write and supplied to write head 82 of combined magnetic head 8. Therefore, when assuming a write current (value) at the beginning of write as W1 and a write current (value) after the beginning of write elapses as W2, W1 (=$W_{nom}$+$W_{boost}$) becomes larger than W2 (=$W_{nom}$) as shown FIG. 4b. The value of the nominal current ($W_{nom}$) is decided by 5 bits. Therefore, as shown in FIG. 4c, it is possible to set current values of 32 levels from "00000" to "11111". Moreover, at the time of assuming that the nominal current ($W_{nom}$) can be supplied up to 60 mA, it is possible to set and supply current values of 32 levels from 0 to 60 mA by assigning 0 mA to "00000," 30 mA to "10000," and 60 mA to "11111." Furthermore, at the time of assuming that the maximum value of the boost current ($W_{boost}$) can be supplied up to 20 mA, it is possible to set and supply current values of 8 levels from 0 to 20 mA by assigning 0 mA to "100," 10 mA to "100," and 20 mA to "111." In this example, because W1 reaches up to 80 mA, it is possible to supply a current value of up to 80 mA to write head 82 at the beginning of write and supply a current value of up to 60 mA to write head 82 after the beginning of write.

In accordance with a preferred embodiment of the present invention, a write current value is increased by adding the boost current ($W_{boost}$) to the nominal current ($W_{nom}$) at the beginning of write operation for a predetermined period of time. The period for adding the boost current ($W_{boost}$) to the nominal current ($W_{nom}$) can be set by AE 12 according to a write gate signal transferred from read/write channel circuit 17 outside of AE 12. As described above, counter 121 of AE 12 counts the number of transitions in which a write gate signal changes from a logical high state to a logical low state. The supply relationship between a write gate signal and a write current is illustrated in FIGS. 5a–5c. FIG. 5a shows a write gate signal, in which data write operation is started when the write gate signal becomes a logical low state. FIG. 5b shows a write current whose height indicates a current value.

As shown in FIG. 5a, the write gate signal includes a logical high state and a logical low state. The present embodiment uses the active low control for supplying a write current in the logical low state. Therefore, by comparing FIGS. 5a and 5b, it is found that a write current is supplied in the logical low state. In the case of HDD 1 using the active low control, continuous write operation by write head 82 is stopped only for a very short time when combined magnetic head 8 moves between sectors of magnetic disk 4. To stop the write operation, the write gate signal becomes logical high only for a very short time. Then, when writing data in the next sector, the write gate signal becomes logical low again. In this specification, change of the write gate signal from a logical high to a logical low state is referred to as "transition." The number of transitions n indicates the $n^{th}$ sector (sector order) in which data will be written after write operation is started. FIG. 5a shows the number of transitions n and FIG. 5b shows the order of a sector in which data is written by following a write current. By referring to FIGS. 5a and 5b, it is possible to recognize the relationship between the number of transitions n and the order of a sector in which data will be written.

When the number of transitions n is equal to or less than a predetermined value N, then HDD 1 supplies a current added with the nominal current ($W_{nom}$) and boost current ($W_{boost}$) as a write current. When the number of transitions n exceeds the predetermined value N, then HDD 1 supplies only the nominal current ($W_{nom}$) as a write current. As shown in FIG. 3, the predetermined value N is set in register 122 of AE 12. By comparing the number of transitions n counted by counter 121 with N set in register 122, a write current value is defined.

The present embodiment shows a case of setting the predetermined value N=5. Therefore, as shown in FIG. 5b, write current value of n=1 to 5 are relatively large. That is, n=1 to 5 denotes a boost period in which the boost current ($W_{boost}$) is added. Write current values from n=6 downward become relatively small compared to the write current values of n=1 to 5. The relatively small currents indicate the nominal current ($W_{nom}$). In this embodiment, it is permitted that a write current uses a waveform provided with overshoot as shown in FIG. 6a or a waveform provided with no overshoot as shown in FIG. 6b.

HDD 1 supplies a current added with the nominal current ($W_{nom}$) and boost current ($W_{boost}$) to write head 82 by assuming the write period up to the fifth sector after start of write as a boost period. As such, it is possible to improve the overwrite characteristic at the beginning of write operation.

Figure 5:
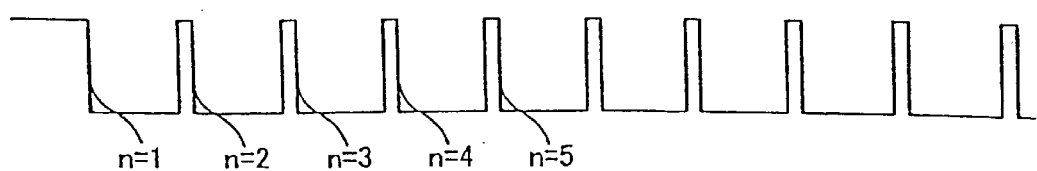
FIGS. 5a–5c illustrates a comparison between write gate signal, write current, and overwrite characteristic of the hard disk drive from FIG. 1.
Figure 5:
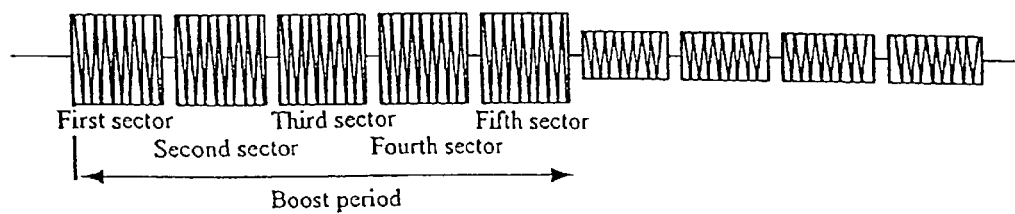
Figure 5:
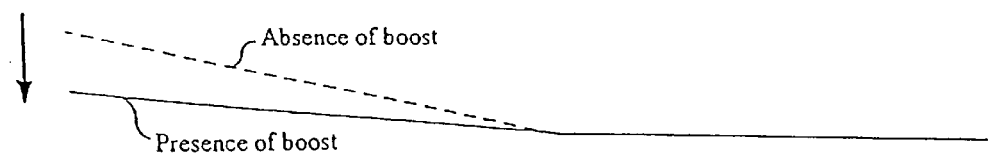
Figure 6:
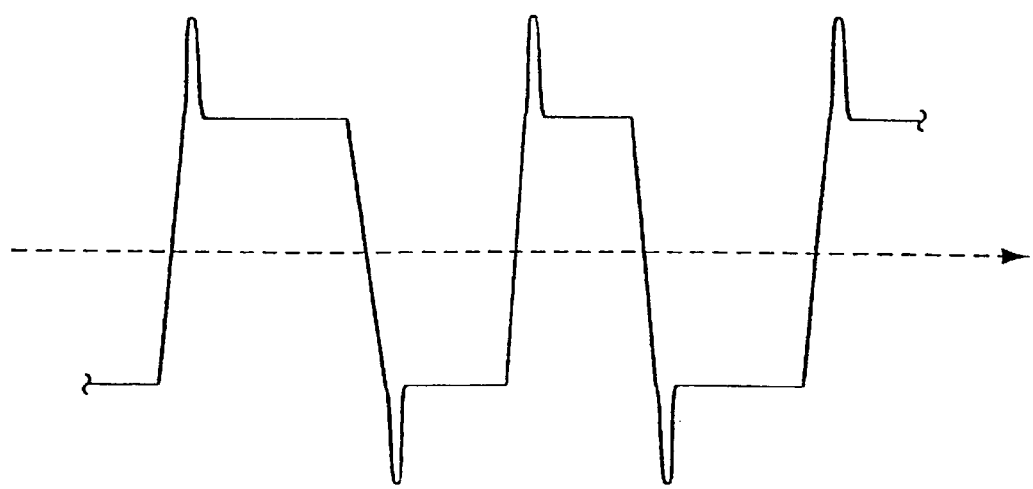
FIGS. 6a–6b illustrates two write current waveforms.
Figure 6:
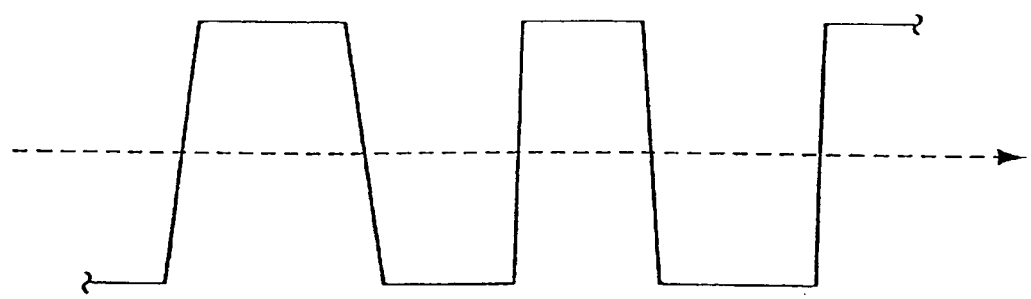

As previously described in FIG. 5, the overwrite characteristic is worse at the beginning of write compared to the subsequent period. Therefore, in this embodiment, a current added with the boost current ($W_{boost}$) at the beginning of write is supplied to write head 82. As a result, as shown in FIG. 5c, it is possible to improve the overwrite characteristic at the beginning of write operation. In FIG. 5c, the horizontal axis indicates the time since start of write and the ordinate indicates the overwrite characteristic. The solid line in FIG. 5c indicates the overwrite characteristic of this embodiment. The dotted line in FIG. 5c indicates the conventional overwrite characteristic according to only the nominal current ($W_{nom}$). In other words, it is possible to improve the overwrite characteristic at the beginning of write when a boost current ($W_{boost}$) is added, compared with the conventional case in which a write current uses only the nominal current ($W_{nom}$).

In this embodiment, when the number of transitions exceeds 5, supply of the boost current ($W_{boost}$) is stopped and only the nominal current ($W_{nom}$) is supplied as a write current. The nominal current ($W_{nom}$) is set as a value capable of properly writing data in a predetermined track of magnetic disk 4 by write head 82. However, when a current value larger than the nominal current ($W_{nom}$) is supplied, data is written in up to a track adjacent to the predetermined track in which data should be written and the adjacent track may be squeezed. Moreover, the current in which the boost current ($W_{boost}$) is added to the nominal current ($W_{nom}$) can be a factor of the squeeze phenomenon. Furthermore, when a write current is too large, the characteristic of a read signal will be deteriorated. Therefore, after a predetermined period elapses since start of write, specifically data is written in the fifth sector, supply of the boost current ($W_{boost}$) is stopped, and only the nominal current ($W_{nom}$) is used as a write current in order to prevent the squeeze phenomenon from occurring.

In the present embodiment, it is assumed a single combined magnetic head is used. However, in an actual HDD, a series of write operations are performed by multiple combined magnetic heads in which multiple magnetic disks are used. In other words, when multiple combined magnetic heads are used and data is written in a track by the $m^{th}$ combined magnetic head, data is continuously written by the $(m+1)^{th}$ combined magnetic head. It is referred to as head change or head switch that write operation is shifted from the $m^{th}$ combined magnetic head to the $(m+1)^{th}$ combined magnetic head. When the head switch is executed, write is newly started by the combined magnetic head concerned. Therefore, for the present embodiment, it is preferable to supply a current having both the nominal current ($W_{nom}$) and the boost current ($W_{boost}$) added to write head 82 constituting combined magnetic head 8.

Figure 7:
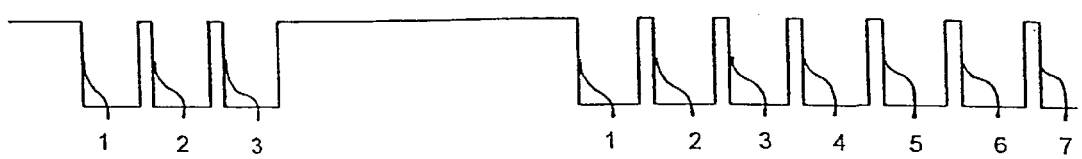
FIGS. 7a–7c illustrates a comparison between write gate signal, write current, and overwrite characteristic of the hard disk drive from FIG. 1.
Figure 7:
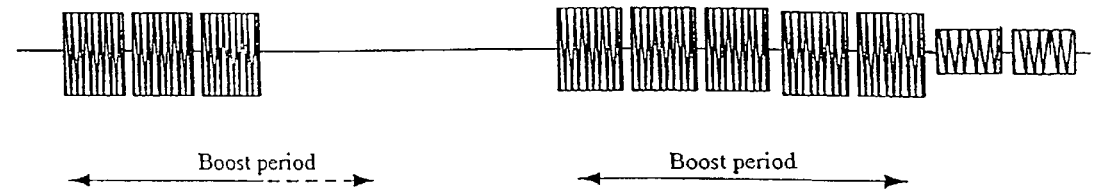
Figure 7:
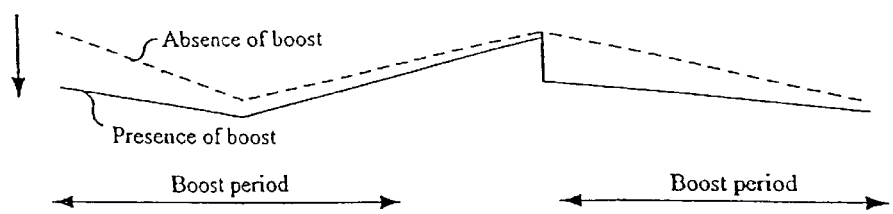
Figure 8:
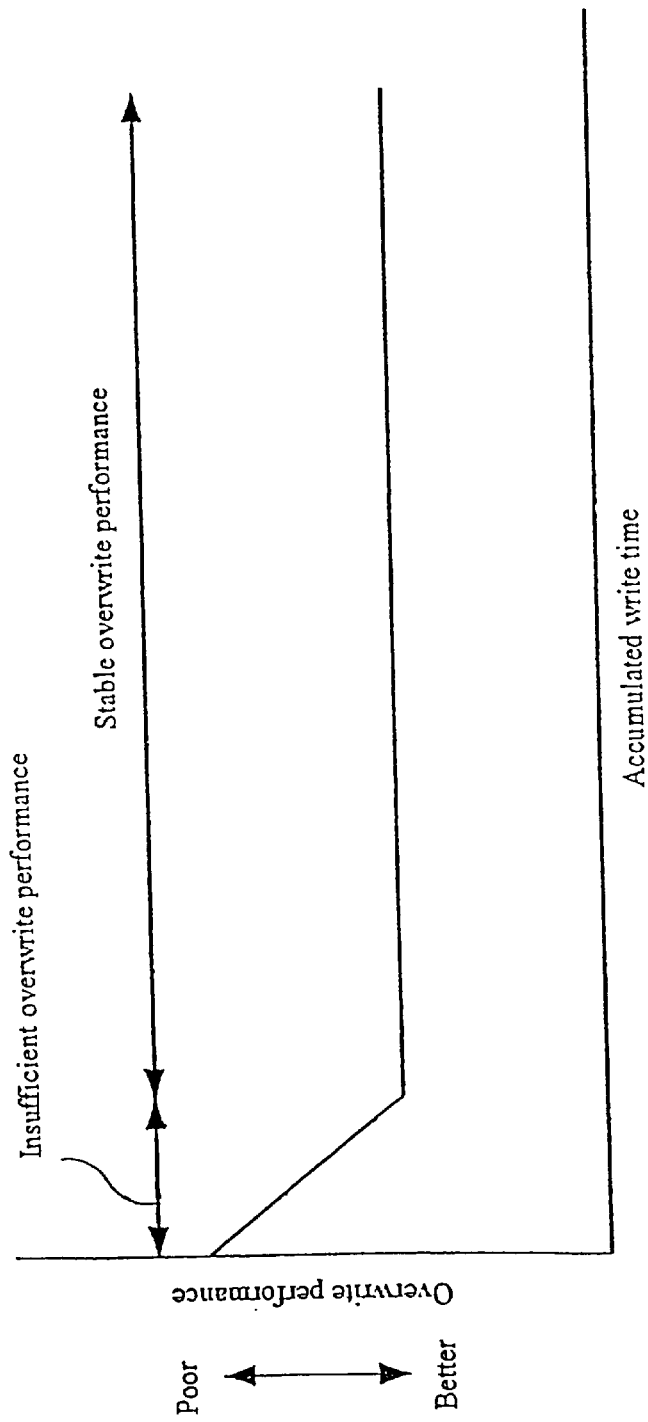
FIG. 8 illustrates the relationship between write time since start of write and overwrite characteristic.

After data write operation is started in accordance with a write command issue from host computer 21, the write operation is interrupted and then, write may be restarted. Even in the process of interruption and restart, this embodiment can correspond to the process as shown in FIG. 7. FIGS. 7a to 7c are illustrations showing the comparison between write gate signal, write current, and overwrite characteristic similarly to the case of FIG. 5. In the examples shown in FIGS. 7a to 7c, the period from start of write to write of data in the fifth sector is set as a boost period in which a current to which the nominal current ($W_{nom}$) and boost current ($W_{boost}$) are added is supplied as a write current. However, as shown in FIG. 7a, after data is written by three sectors after start of write, write operation is interrupted in accordance with a designation from host computer 21. Therefore, as shown in FIG. 7b, while data is written in three sectors after start of write, a current to which the nominal current ($W_{nom}$) and boost current ($W_{boost}$) are added is used as a write current. The overwrite characteristic after start of write operation can be improved in this embodiment (presence of boost) in which the boost current ($W_{boost}$) is added compared to the conventional case (absence of boost) in which a write current uses only the nominal current ($W_{nom}$).

As shown in FIG. 7c, however, the overwrite characteristic tends to return to the initial state due to interruption of write. Because data is not written while the write operation is interrupted, FIG. 7c shows the overwrite characteristic during the interruption of write operation. In this example, the overwrite characteristic almost returns to the level at start of write during interruption of write.

When a command for prompting restart of write is issued (or asserted) from host computer 21, AE 12 supplies a write current to write head 82 of combined magnetic head 8. In this case, because the overwrite characteristic is returned to the level at beginning of write due to interruption of write, a boost period is set again in the case of this embodiment as shown in FIGS. 7b and 7c. As such, it is possible to improve the overwrite characteristic after restart of write operation. After the boost period elapses, supply of the boost current ($W_{boost}$) is stopped and a write current using only the nominal current ($W_{nom}$) is supplied to write head 82.

In this case, it may be difficult to measure the write interruption time by AE 12. Therefore, it is preferable to designate resetting of boost from HDC 18. For example, a mechanism is considered that sends a signal or a command by the operation for reading (or writing) data from or in register 122 to initialize a condition about boost-current supply of register 122. In this case, counter 121 is reset as shown in FIG. 3. Moreover, after the write operation followed by supply of the boost current ($W_{boost}$) is completed, then a series of write operations only by the nominal current ($W_{nom}$) are completed, and a predetermined time elapses, write operation may be restarted by combined magnetic head 8 concerned. In this case, because it is estimated that the overwrite characteristic of combined magnetic head 8 is deteriorated, a write current obtained by adding the boost current ($W_{boost}$) to the nominal current ($W_{nom}$) is supplied in accordance with restart of write operation. When AE 12 includes a timer, determination is made in accordance with the timer. When AE 12 does not include a timer, it is possible to initialize boost operation in accordance with a command issue (assertion) or special command for reset from HDC 18.

Moreover, a data storage device of the present invention is not restricted to a configuration for activating supply of the boost current ($W_{boost}$) following start of write without fail. As previously described, the overwrite characteristic tends to become insufficient when the operating environment temperature of HDD 1 is too low or data is written in a data track close to the circumference of magnetic disk 4. Therefore, when the boost current ($W_{boost}$) is supplied under other than the above state, the squeeze phenomenon may be occur or the characteristic of a read signal may be deteriorated because a write current is too large. Therefore, it is also possible to select a case of activating boost operation in accordance with the operating environment of HDD 1 or a case of inactivating boost operation. For example, boost operation can be realized by assigning an enable(valid)/disable(invalid) bit to register 122. When using FIG. 4(a) as an example, a bit "b8" is assigned to determine whether boost operation should be enabled or disabled. Then, HDC 18 determines whether boost operation should be enabled or disabled in accordance with conditions for activating boost operation such as the operating environment temperature and the position of combined magnetic head 8 on magnetic disk 4. The operating environment temperature can be detected by a temperature sensor. Moreover, HDC 18 must know the position of combined magnetic head 8 on magnetic disk 4. Therefore, it is possible to write a value corresponding to enabled or disabled of boost operation in the bit "b8" in accordance with the above pieces of information.

For the above-mentioned embodiment, a configuration is described in which the boost current ($W_{boost}$) is supplied at the beginning of write. However, the present invention also contemplates the case of supplying the boost current in other period. That is, by counting the number of transitions of a write gate signal not only at the beginning of write but also in other periods. The present invention makes it possible to supply the boost current ($W_{boost}$) in any period under write operation. Furthermore, it is permitted to prepare the timer of AE 12 perform write operation only by the nominal current ($W_{nom}$) in accordance with the transition of a write gate signal after a set time elapses without counting the number of transitions of the write gate signal.

As has been described, the present invention provides an improved method for controlling write current to a write head when writing data on a hard disk drive.

While the invention has been particularly shown and described with reference to a preferred embodiment, it will be understood by those skilled in the art that various changes in form and detail may be made therein without departing from the spirit and scope of the invention.

What is claimed is:

1. A data storage device, comprising:
   a rotating storage medium in which data are magnetically written;
   a write head for writing data in said storage medium; and
   a write current control circuit for increasing write current-value settings to be supplied to said write head during a predetermined elapsed time from the beginning of a write operation.

2. The data storage device of claim 1, wherein said data storage device includes a plurality of said write heads and rotating storage media and performs operations for successively switching said write heads and writing data in said rotating storage media, wherein said write current control circuit increases said write current-value settings to be supplied to said write head during a predetermined elapsed time after a start of write by each write head during said switching operations.

3. A data storage device, comprising:
   a rotating storage medium in which data are magnetically written;
   a write head for writing data in said storage medium; and
   a write current control circuit for increases said write current-value settings to be supplied to said write head during a predetermined elapsed time after a restart of a write operation from a write operation interruption.

4. A data storage device, comprising:
   a magnetic disk having data tracks divided into data sectors;

a combined magnetic head including a write head for writing data on said magnetic disk and a read head for reading data from said magnetic disk; and a write-current control circuit for supplying a write current to said write head in accordance with a first write current value to be constantly supplied to said write head during a write operation, and a second write current value to be added to said first write current value during a predetermined write period.

5. The data storage device of claim 4, wherein said write-current control circuit measures said predetermined write elapsed time by counting a number of sectors in which data will be written.

6. The data storage device of claim 5, wherein said write-current control circuit supplies a write current value obtained by adding said second write current value to said first write current value when said counted number of sectors is equal to or less than a predetermined value.

7. The data storage device of claim 6, wherein said write-current control circuit supplies a write current according to said first write current value when said counted number of data sectors exceeds said predetermined value.

8. The data storage device of claim 4, wherein said write-current control circuit supplies a write current to said write head without adding said second write current value in accordance with an operating environment of said data storage device.

* * * * *

UNITED STATES PATENT AND TRADEMARK OFFICE
CERTIFICATE OF CORRECTION

PATENT NO.     : 6,798,598 B2
DATED          : September 28, 2004
INVENTOR(S)    : Suzuki et al.

It is certified that error appears in the above-identified patent and that said Letters Patent is hereby corrected as shown below:

Column 8,
Lines 61-64, please replace with:
-- a write current control circuit for *increasing* write current-value settings to be supplied to said write head during a predetermined elapsed time after a restart of a write operation from a write operation interruption. --

Signed and Sealed this

Ninth Day of August, 2005

JON W. DUDAS
*Director of the United States Patent and Trademark Office*